United States Patent

[11] 3,575,585

[72] Inventor Leo G. Monford, Jr.
    Texas City, Tex.
[21] Appl. No. 880,272
[22] Filed Nov. 26, 1969
[45] Patented Apr. 20, 1971
[73] Assignee The United States of America as represented by the Administrator of the National Aeronautics and Space Administration

[54] RADIOMETRIC TEMPERATURE REFERENCE
    8 Claims, 2 Drawing Figs.
[52] U.S. Cl. .................................................. 219/505
[51] Int. Cl. .................................................. H05b 1/02
[50] Field of Search ........................................ 219/501, 499, 504, 505; 323/22

[56] References Cited
    UNITED STATES PATENTS

| | | | |
|---|---|---|---|
| 2,918,558 | 12/1959 | Evans | 219/499 |
| 3,133,242 | 5/1964 | Harries | 323/22 |
| 3,215,818 | 11/1965 | Deaton | 219/499 |
| 3,448,245 | 6/1969 | Brouneus et al. | 219/505 |

Primary Examiner—Bernard A. Gilheany
Assistant Examiner—F. E. Bell
Attorneys—Marvin J. Marnock, Marvin F. Matthews and G. T. McCoy ABSTRACT: A system or component (device) having an electrical characteristic which varies with changes in its own temperature is employed as part of a feedback loop in an operational amplifier circuit. Power applied to the device raises its temperature which in turn changes the value of its electrical characteristic. The output of the operational amplifier circuit forms the input to a second operational amplifier where the polarity of the signal is inverted and fed back to the input of the first operational amplifier circuit in a positive feedback loop. The circuitry associated with the device automatically alters the power supplied to the device causing it to heat or cool until an equilibrium condition is reached, corresponding to a fixed temperature and fixed energy radiation of the device. Any tendency for variation in the temperature of the device produces an almost instantaneous change in the power supplied to the device which thus acts to maintain a constant temperature and a constant infrared energy level radiation from the body.

PATENTED APR 20 1971    3,575,585

Leo G. Monford, Jr.
INVENTOR

BY
ATTORNEYS

RADIOMETRIC TEMPERATURE REFERENCE

ORIGIN OF THE INVENTION

The invention described herein was made by an employee of the United U.S. Government and may be manufactured and used by or for the Government for governmental purposes without the payment of any royalties thereon or therefor.

BACKGROUND OF THE INVENTION

1. Field of the Invention

The present invention relates to the field of testing and measurement of physical phenomena. More specifically, the present invention relates to means for generating or producing a predetermined energy output to form a standard against which a variable or unknown energy may be compared.

In the way of example, the present invention relates to the field of measuring instruments such as infrared spectrometers which are employed to examine and measure different bands and frequencies over a spectrum of infrared radiation. Measuring instruments of the type being considered herein have been used in the NASA Earth Resources Program, which has among its objectives, the measurement of physical phenomenon such as sea surface temperature; the temperature of heat energy radiation of different type foliage; temperature variations in healthy and diseased crops; and temperature characteristics of varying geological formations. It is anticipated that the present invention will have significant medical applications in that it is readily applicable to systems wherein precise body temperature measurements are required.

The present invention is also anticipated to be employed in the field of space travel particularly in view of its small size, light weight, low power consumption, simplicity and reliability of construction. Specifically, the devices of the type employed with the present invention may be used in systems which directly monitor point temperatures of bodies and, with respect to space activities, may be used for thermal mapping of extraterrestrial bodies such as the moon and the planets.

2. Brief Description of the Prior Art

Many conventional instruments which have been employed for the purpose of measuring variable energy levels employ an internal calibration or reference source having a fixed, known energy level which provides the means for determining the absolute value of the unknown energy level being tested or measured. The reference source or standard employed in conventional testing systems generally include some means for maintaining the energy level output of the standard at a fixed value so that measurements being based upon the standard will remain accurate. A major problem associated with the prior art devices which employ fixed standards is that the corrective response of the system which supplies the energy required for maintaining the standard at the predetermined output level is slow enough that variations occur in the energy level output of the standard during the corrective procedures. Thus, conventional standards having energy supplied for the purpose of maintaining a constant level output will vary between an upper and lower energy output level limit which in many cases covers an undesirably broad range. It is evident that variations in the value of the standard will produce an error in the measured value of the unknown energy level equal to the error in the standard.

In conventional systems, variations in the output level of the standard are detected by a sensing means, an appropriate output signal is generated and the energy input to the standard is either increased or decreased as required to bring the heat energy output level back to the desired point. In such systems, undesirable fluctuations in the level occur since a finite amount of time is required for the sensing means to detect a change in the output energy level of the standard, convey this information to an energy source feeding the standard and then convert the power supplied to the standard into the energy emitted from the standard. Expensive and elaborate systems have been proposed and employed in the prior art for the purpose of reducing this correction lag time to thereby reduce the energy level output variations of the standard. It will be understood, however, that such systems are expensive, difficult to construct and, because of the large number of components which are required, are often undependable in operation.

SUMMARY OF THE INVENTION

The present invention employs a component, having an electrical resistive characteristic which varies with its temperature, both as the energy emitting standard and as the sensing element to produce and maintain a fixed, preselected energy output with virtually no fluxuation. The component is self-heated until its resistance matches a preselected, fixed value and is thereafter maintained at such value by continuous control of the power being supplied. It should be noted that the resistance of any such component used in this circuit is the temperature determining factor. This resistance can be measured only from end point to end point of the resistance element.

In one form of the invention, a thermistor is constructed from a small body of a suitable metal oxide semiconductor material coated with a layer of solder having a high silver content. Suitable electrical leads are secured to the device which is then painted with a layer of high emissivity flat black paint which makes the device nonreflective and as close as practical to a perfect radiator. The painted thermistor is then encapsulated within a suitable case and is potted within the case with a low heat absorbing, electrically insulative material. The thermistor having the described construction generates heat when an electrical power supply is connected across its leads, with the semiconductor material acting in such a way that resistance of the device varies inversely with temperature variation.

Other features and advantages of the present invention will be better understood from the following specification, the related drawings and claims.

DESCRIPTION OF THE PREFERRED EMBODIMENTS

Figure 1:
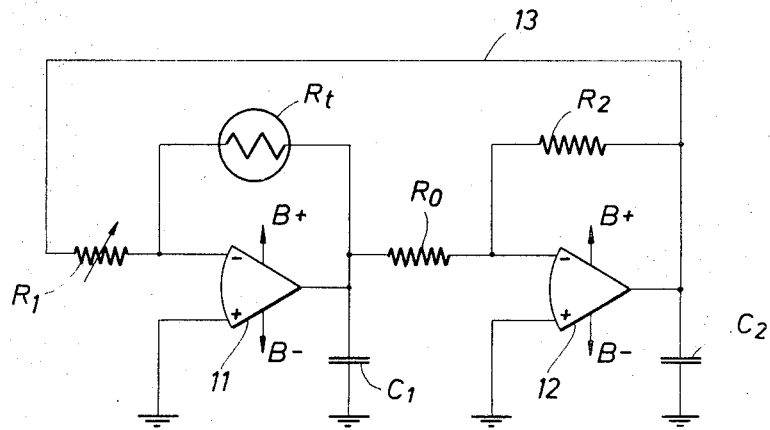
FIG. 1 is a circuit diagram of the radiometric temperature reference of the present invention.

With reference to FIG. 1, the radiometric temperature reference of the present invention indicated generally at 10 includes a first operational amplifier 11 whose output is fed through a series resistance $R_o$ to a second operational amplifier 12. The output of operational amplifier 12 is in turn fed back through feedback line 13 to a variable resistance $R_1$ at the input amplifier 11 forming a positive, system feedback loop. A thermistor $R_t$ is connected between the input and the output of operational amplifier 11 forming a subsidiary feedback loop in the first stage of circuit 10 and a resistor $R_2$ is connected across the second operational amplifier 12 to form a second subsidiary feedback loop. Capacitors $C_1$ and $C_2$ are connected between ground and the outputs of operational amplifiers 11 and 12, respectively, for a purpose to be described hereinafter.

As indicated by the schematic illustrations of FIG. 1, the input signals to operational amplifiers 11 and 12 are formed between the negative and positive input terminals of the amplifiers with the positive terminals being connected to ground. It will be understood that the positive and negative designations are relative references and appropriate changes in the system may be made whereby the reference voltage is some fixed voltage value.

With suitable power supplies of $B+$ volts and $B-$ volts connected to the operational amplifiers 11 and 12 as indicated in FIG. 1, the operating temperature of the thermistor $R_t$ is determined by the value of variable resistor $R_1$. Amplifier 11 operates in a constant current configuration while amplifier 12 has unity gain and inverts the polarity of its input signal to form positive feedback through the resistor $R_1$. When the circuit is initially energized, with the thermistor $R_t$ cool, the resistance value of $R_1$ is less than the resistance value of the thermistor $R_t$ which establishes a gain of greater than unity for the first stage of the circuit 10. With the gain of the first stage greater than unity, the voltage across the thermistor $R_t$ increases until it approaches that of the power supply voltage. The increased voltage supplied to the thermistor $R_t$ heats it, causing a corresponding decrease in its resistance as temperature increases until the resistance value of $R_t$ is approximately equal to that of $R_1$ whereupon the voltage across thermistor $R_t$ reaches the value necessary for maintaining resistance equilibrium between $R_t$ and $R_1$.

The two-stage circuitry illustrated in FIG. 1 cooperates to produce the desired results with any increase or decrease in the temperature of thermistor $R_t$. The second stage circuitry including resistors $R_o$ and $R_2$ cooperate with the operational amplifier 12 to amplify the voltage in a negative direction to produce a correspondingly higher voltage level at variable resistor $R_1$ and the input to operational amplifier 11, with it being understood that operational amplifier 12 produces 180° phase shift in signal appearing at its input to produce the proper polarity at the input to operational amplifier 11.

It will be appreciated that the illustrated circuit configuration operates to produce gain approaching infinity whenever the resistance values of $R_1$ and $R_t$ are different. If the temperature of thermistor $R_t$ tends to decease to any degree, its resistance value will undergo a corresponding increase due to the inherent action of the thermistor. Under these conditions, the voltage across the thermistor $R_t$ will automatically increase by action of the circuitry associated with the thermistor causing a corresponding temperature increase. Thus, as the thermistor tries to cool down, resistance is caused to increase and the circuit automatically and very quickly acts to correct the temperature decrease resulting in virtually a constant energy level radiation. The correction of any tendency toward temperature variation is almost instantaneous and for all intents and purposes is so fast that there is substantially no variation at all in the amount of energy radiated by the thermistor. This result is directly attributable to the fact that the thermistor acts not only as the sensor but also as the heat generating source itself.

As will be understood by those having skill in the art, operational amplifiers of the type illustrated in FIG. 1 are capable of producing voltages which increase indefinitely tending to create oscillation. Capacitors $C_1$ and $C_2$ have been provided for the purpose of controlling the circuit reaction to temperature change to thereby prevent such oscillation. It will also be understood that the tendency to oscillate in the circuit is an inherent result of the sensitivity of the circuit since gain of the operational amplifiers and the sensitivity of these amplifiers controls the sensitivity of the detection mechanism of the circuit. As a practical matter, the sensitivity of the sensing function of the circuit is limited only by the limiting characteristics of the circuit components employed in the associated circuitry of the operational amplifiers. An additional limiting factor is of course the ability of the thermistor $R_t$ to act as close as possible to a known characteristic curve.

It should also be noted that the operational amplifiers of the type which may be used with the present invention will oscillate due to high gain input and that a suitable RC circuit or other compensating means may be required in a standard configuration to prevent oscillation. Undesirable oscillation may also occur because of the high sensitivity of the system 10 to thermal changes. For this reason, it is desirable to thermally isolate the thermistor $R_t$ from its environment, increase its thermal mass or provide appropriate electrical damping to prevent oscillations.

Figure 2:
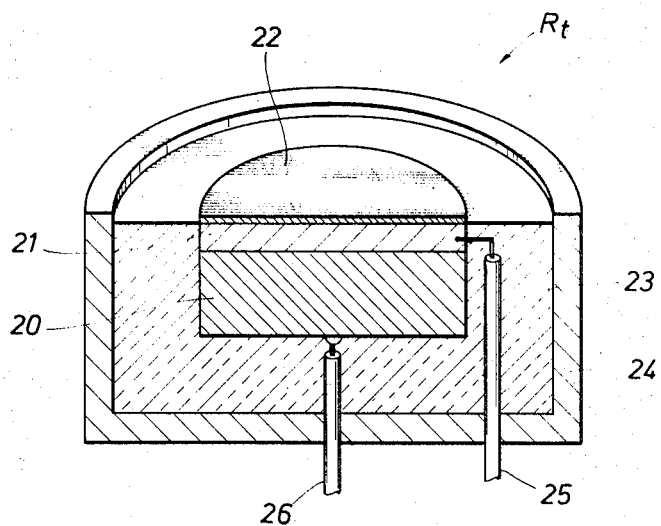
FIG. 2 is perspective view, in vertical section illustrating a thermistor suitable for use with the radiometric temperature reference of the present invention.

Referring to FIG. 2, there is illustrated an exemplary construction for the thermistor $R_t$ which may be used with the present invention. The thermistor $R_t$ includes a block 20 of a suitable, metal oxide semiconductor having a resistance value which varies inversely with variation in temperature of the material. A layer 21 of high heat conductivity material is deposited along the top of the block 20 to provide a radiating surface. The layer is preferably solder having a high silver content which is capable of being adhered to the material 20 to provide the desired high heat conductivity. The layer 21 is covered with a surface coat 22 of high emissivity, flat black paint which renders the radiating device nonreflective and ensures complete radiation from the body. The block 20 and painted metal layer 21 are potted in a suitable, low heat absorbing, electrically insulating material 23 and the entire assembly is mounted in a suitable metal container 24 through which insulated leads 25 and 26 extend for connecting the thermistor $R_t$ into the circuit illustrated in FIG. 1. It is therefore apparent that heat generated in the block 20 is conducted by the metal laver 21 and radiated through the paint coat 22.

While the foregoing invention has been described with specific reference to a thermistor, it will be understood that other devices or components having an electrical characteristic which varies with variations in temperature may be employed. It will further be understood that the circuit designed around such alternative devices or components must be adapted to provide the desired corrective power input for corresponding variations in the given electrical characteristic with any variations in temperature. Positive coefficient devices such as resistance thermometers could be used as a temperature reference device if the position of $R_1$ and $R_t$ in the circuit were interchanged. Circuit values such as the unity gain of amplifier 12 may also vary depending on actual circuit characteristics.

Although primarily described herein as a radiated energy reference, it should be understood that the circuit maintains a constant temperature therefore qualifying for use in many other circumstances. It will also be appreciated that with appropriate changes in the associated electrical circuitry, the output of the standard may be varied sinusoidally or according to any other given time function to provide a variable reference standard.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A reference standard comprising:
    a. electrical circuit means;
    b. power supply means for supplying electrical power to said circuit means;
    c. heat energy output means included in said circuit means and connected with said power supply means for receiving power therefrom, said output means including a variable resistance means having an electrical resistance characteristic which increases in value as the eat energy output value of said output means decreases;
    d. control means included in said circuit means for changing the power supplied to said heat energy output means as a predetermined function of the value of said electrical resistance characteristic to produce predetermined heat energy output values from said output means, said control means including an operational amplifier means having a feedback loop, said control means including means for decreasing the power supplied to said heat energy output means as said resistance of said output means decreases.

2. The reference standard as defined in claim 1 wherein said operational amplifier means further includes first and second operational amplifier means with the output of said first amplifier means forming the input of said second amplifier means and with the output of said second amplifier means being fed back to the input of said first operational amplifier means as positive feedback.

3. The reference standard as defined in claim 2 wherein said heat energy output means is connected between the input and the output of said first operational amplifier means.

4. The reference standard as defined in claim 3 wherein said heat energy output means includes a thermistor.

5. A reference standard comprising:
a. electrical circuit means;
b. power supply means for supplying electrical power to said circuit means;
c. heat energy output means included in said circuit means and connected with said power supply means for receiving power therefrom, said output means having an electrical characteristic which varies in value as a function of the heat energy output value of said output means; and
d. control means included in said circuit means for changing the power supplied to said heat energy output means as a predetermined function of the value of said electrical characteristic to produce predetermined heat energy output values from said output means, said heat energy output means including a body of electrically semiconductive material having an electrical resistance value which decreases with increases in temperature of said material according to a predetermined function, heat conductive means connected with said body, and means for supplying an electrical voltage across spaced positions on said body.

6. The reference standard as defined in claim 5 further including:
a. a black coating disposed over said heat conductive means for providing uniform heat energy radiation and low reflection from said body and heat conductive means; and
b. a coating of low heat conductive material surrounding said body and heat conductive means.

7. The reference standard as defined in claim 6 wherein:
a. said heat conductive means includes a layer of silver solder adhered to said body; and
b. separate, spaced electrically conductive leads are electrically connected to said silver solder and to said material in said body.

8. A reference standard comprising;
a. electrical circuit means;
b. power supply means for supplying electrical power to said circuit means;
c. heat energy output means included in said circuit means and connected with said power supply means for receiving power therefrom, said output means including a variable resistance means having an electrical resistance characteristic which decreases in value as the heat energy output value of said output means decreases;
d. control means included in said circuit means for changing the power supplied to said heat energy output means as a predetermined function of the value of said electrical resistance characteristic to produce predetermined heat energy output values from said output means, said control means including first and second operational amplifier means with the output of said first amplifier means forming the input of said second amplifier means and with the output of said second amplifier means being fed back to the input of said first operational amplifier means as positive feedback, said control means decreasing the power supplied to said heat energy output means as said resistance of said output means decreases. decreases.